Dec. 25, 1956         C. J. McKILLOP, JR            2,775,270
                       DISPENSING APPARATUS

Filed May 12, 1954                              3 Sheets-Sheet 1

CLINTON J. MC KILLOP, JR.
          INVENTOR.

BY
   Lynn Latta
        ATTORNEY.

Dec. 25, 1956  C. J. McKILLOP, JR  2,775,270
DISPENSING APPARATUS
Filed May 12, 1954   3 Sheets-Sheet 2

CLINTON J. MC KILLOP, JR.
INVENTOR.

BY
ATTORNEY.

Dec. 25, 1956   C. J. McKILLOP, JR   2,775,270
DISPENSING APPARATUS
Filed May 12, 1954   3 Sheets-Sheet 3

CLINTON J. MC KILLOP, JR.
INVENTOR.

BY Lynn Latta
ATTORNEY.

United States Patent Office 2,775,270
Patented Dec. 25, 1956

2,775,270

DISPENSING APPARATUS

Clinton J. McKillop, Jr., Oxnard, Calif.

Application May 12, 1954, Serial No. 429,148

5 Claims. (Cl. 141—373)

The invention relates to an apparatus for dispensing a measured quantity of granular or powdered material on each cycle of operation thereof. The apparatus is particularly useful in dispensing a measured quantity of ground coffee (whether "regular" or "drip" grind), and the measuring spoon may be constructed with the appropriate capacity for dispensing the correct amount of coffee to brew one cup of liquid coffee.

An object of the invention is to provide an apparatus for storing and then dispensing a measured quantity of powdered or granular material on each cycle of operation thereof.

Another object of the invention is to provide a dispensing apparatus employing novel construction features.

Another object of the invention is to provide a canister type dispensing apparatus which may be manufactured in different sizes, one size being specifically suitable for handling ground coffee wherein on each cycle of operation of the dispensing unit, the correct amount of coffee being discharged for the brewing of one cup of liquid coffee.

Other objects will be apparent in the ensuing specifications and appended drawings in which.

Figure 1:
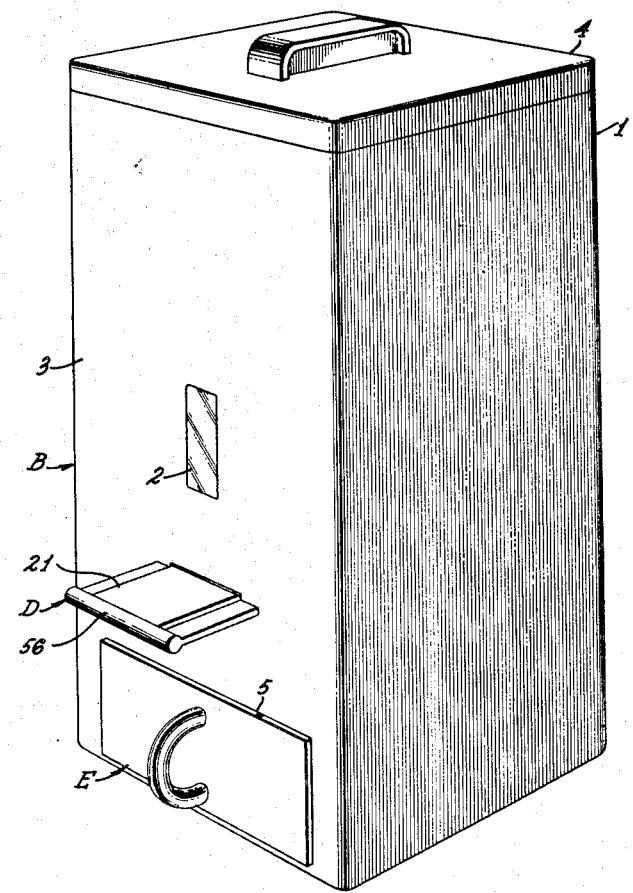
Fig. 1 is a perspective view of the dispensing apparatus.

In general the dispensing apparatus includes a dispensing unit A which is mounted within a canister B, the dispensing unit including a measuring spoon C which empties its contents on each cycle of operation of the slide-valve D into the removable storage drawer E.

The upper portion 1 of the canister may be of sufficient extent to store the contents, for example, of a one pound tin of ground coffee or by increasing the length of the upper portion of the canister it can be made to accommodate a two pound tin of ground coffee. Since the dispensing apparatus could be utilized for dispensing measured quantities of various types of powdered or granulated material, it will be understood that the apparatus may be made in any of a pre-selected number of sizes.

The upper end of the canister is open and is normally closed off by means of the removable lid 4. When the apparatus is being utilized for dispensing of coffee, the contents of the one pound or two pound can of ground coffee are poured into the upper end of the canister and then the canister is closed off with the lid 4 and the lid need not be removed until a fresh supply of coffee is needed. A transparent sight window 2 is mounted in the front wall 3 of the canister and may be utilized for determining when a fresh supply of ground coffee needs to be emptied into the canister. The coffee within the canister will remain fresh when the lid 4 is not removed until a fresh supply of coffee is needed.

A large opening 5 is cut through the front wall of the canister near the bottom thereof to accommodate the storage drawer E. A pair of shallow ribs 6 and 7 may be provided in the floor of the canister for engagement with the side walls of the drawer to guide the drawer as it is moved into and out of the canister. When the apparatus is being utilized to dispense ground coffee, the drawer E is of sufficient capacity to store enough ground coffee to brew at least eight cups of liquid coffee.

Figure 2:
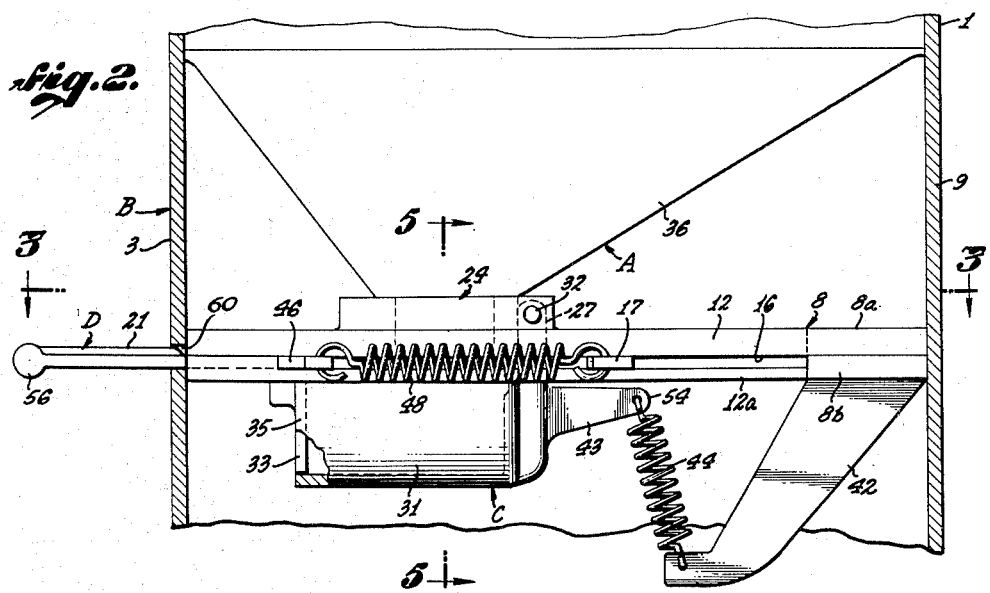
Fig. 2 is a side elevational view, partly in section, of the dispensing unit which is mounted within the canister.

The dispensing unit A includes the carrier which may be made of an upper half 8a and a lower half 8b if desired and which is referred to generally by the numeral 8 and which may be made of metal or plastic and which extends transversely across the width of the canister and is anchored to the front and rear walls 3 and 9 respectively thereof. If the canister and hopper 36 are of plastic material the upper border of the hopper along all four of its edges can be adhered to the four walls of the canister to prevent the material from escaping between the edges of the hopper and the canister wall. If canister and hopper are of metal, a welding, brazing or soldering of the hopper edges to the canister walls can be effected. If the carrier halves are of metal, their ends can be anchored to the canister walls by welding, brazing or soldering. If the canister and carrier are made of plastic material, the ends of the carrier could be anchored to the front and rear walls of the canister by means of an appropriate adhesive if desired. Viewing Fig. 3 the carrier has the side rails 11 and 12 which may be integral with the web portion 13 formed on the upper half 8a of the carrier at the rear end thereof. An open area designated by the numeral 14 is provided between the opposite rail portions 11 and 12 and 11a and 12a. Referring to Fig. 2 it will be noted that elongated slots 15 and 16 (see Fig. 4 for slot 15) are formed between the upper and lower rail portions 11 and 11a and 12 and 12a to permit the sliding movement of the bar 17 which extends across the entire width of the carrier and projects outwardly beyond the opposite sides thereof. The forward ends of the upper and lower rail members have longitudinally extending channels 19 and 20 formed between the inner sides thereof, which channels extend up to and communicate with the slots 15 and 16. The slide valve D projects through a horizontal valve slot 60 and has its side margins slidably received within the guide channels 19 and 20 to permit the slide valve to be reciprocated relative to the carrier for actuating the dispensing spoon C. The slide valve may have a reinforcing rib 21 formed in its upper face and being of a width slightly less than the span between the inner edges 22 and 23 of the upper rail members so that the side edges of the rib will clear the inner edges of such rail members when the slide valve is pushed inwardly.

Figure 4:
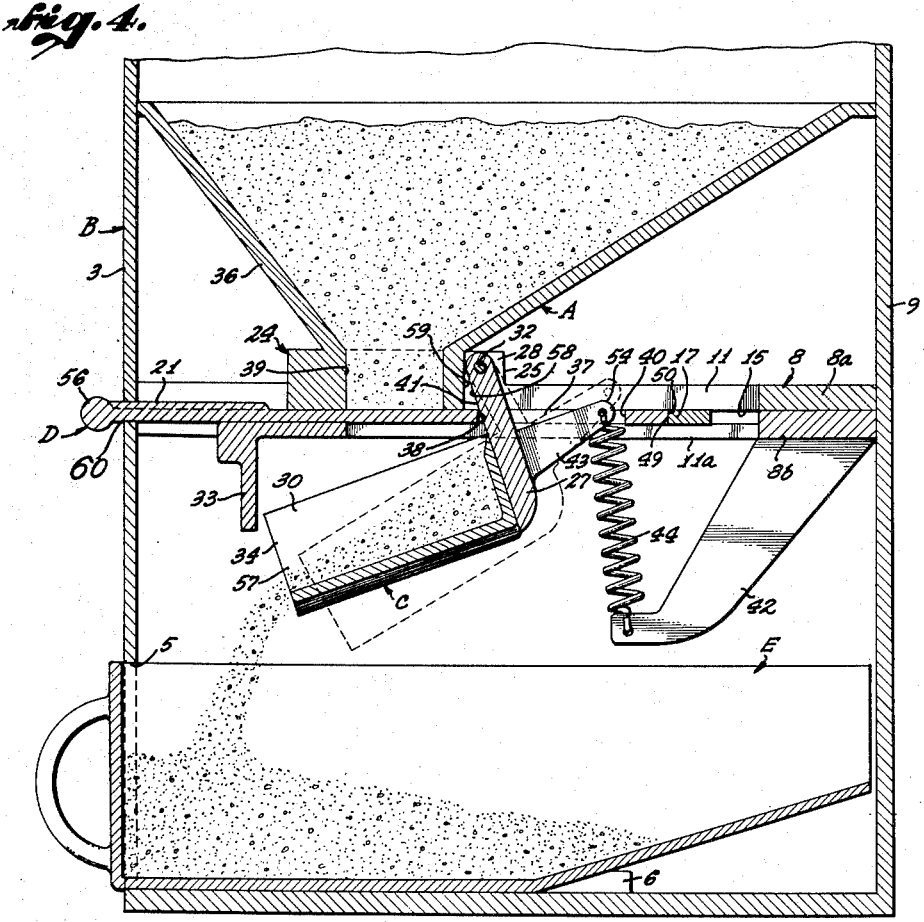
Fig. 4 is a sectional view taken on the line 4—4 of Fig. 3.
Figure 5:
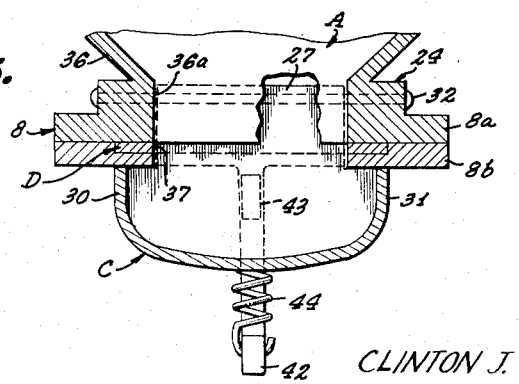
Fig. 5 is a sectional view taken on the line 5—5 of Fig. 2.

An upwardly extending boss referred to generally by the numeral 24 is formed on the upper surface of the upper half of the carrier and is generally C-shaped in cross section. Viewing Fig. 3 it will be noted that the terminal portions 25 and 26 of the boss are spaced from each other to accommodate the rear wall 27 of the measuring spoon C which is mounted for swinging movement between the end faces 28 and 29 of the terminal portions of the boss. Viewing Figs. 2, 4 and 5 it will be noted that the measuring spoon has its side walls 30 and 31 terminating so that the upper edges thereof lie against the underneath faces of the lower rail members 11a and 12a (see Fig. 5) when the spoon is in closed position. The rear wall 27 of the measuring spoon extends upwardly beyond the upper edges of the side walls and a pin 32 extends through the rear wall of the spoon and through the terminal portions 25 and 26 of the boss 24, said spoon being free to swing about the axis of the pin 32. The carrier 8 has a downwardly projecting wall 33 fixed to the undersurface thereof (and which may be integral therewith if desired), said wall being of slightly lesser width than the span between the side walls 30 and 31 of the measuring spoon and being positioned relative to the measuring spoon so that the end portions 34 and 35 of the spoon side walls embrace the partition wall 33 (as shown in Fig. 2) when the spoon is in closed position. The configuration of the wall 33 would conform to the internal sectional configuration (as shown in Fig. 5) of the measuring spoon, so that when the spoon is in closed position, the wall 33 in effect forms the fourth enclosure wall of the spoon.

The hopper 36 terminates at the upper surface of the boss 24 and may if desired be integral with said boss or it could be fabricated with a separate throat fitting into the interior of the boss. The side walls of the hopper converge and open into the throat 36a which may be of generally rectangular shape.

Figure 3:
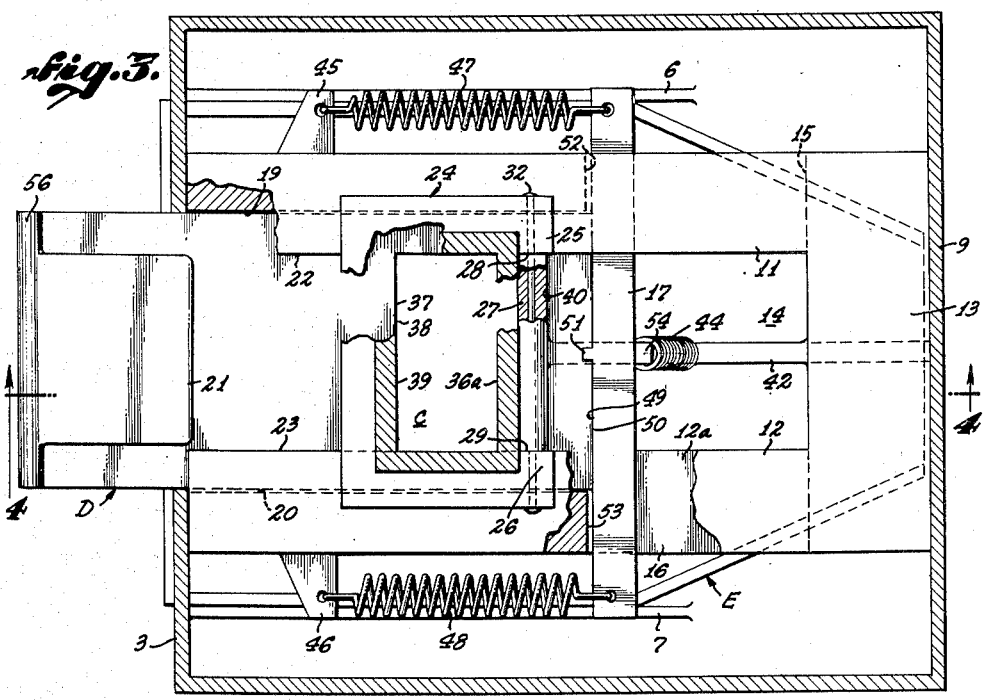
Fig. 3 is a sectional plan view taken on the line 3—3 of Fig. 2.

Viewing Fig. 3 the slide valve D has an opening 37 cut therethrough, the opening being of the same length as the length of the throat 36a, the opening 37 in the slide valve however being of greater width than the width of the throat 36a, so that when the front edge 38 of the opening 37 is in registry with the front wall 39 of the throat, the rear edge 40 of the opening in the slide valve will engage the outer face of the rear wall 27 of the dispensing spoon, as best shown in Fig. 3. When the rear edge 40 of the slide valve engages the rear wall of the dispensing spoon, the outward travel (in valve opening direction) of the slide valve ceases. When the slide valve is pushed inwardly the forward edge 38 of the opening gradually closes off the throat 36a of the hopper until such throat is fully closed off. Then continued inward movement of the slide valve causes the forward edge 38 to engage the front face 41 of the rear wall of the measuring spoon thereby causing the spoon to swing about the axis of pin 32 and to dump its contents into the drawer E. The carrier 8 has a downwardly depending tongue 42 fixed thereto and the spoon has a rearwardly extending tongue 43 fixed thereto. The tension spring 44 is secured at its opposite ends to the said tongues to normally urge the spoon into closed position whenever the slide valve is retracted as shown in Figs. 2 and 3.

A pair of lugs 45 and 46 are fixed on opposite sides of the carrier 8 and the compression springs 47 and 48 are anchored between the lugs and the opposite ends of the bar 17 as shown in Figs. 2 and 3 to automatically effect the retraction of the slide valve D into the fully open position as shown in Figs. 2 and 3. The bar 17 has its inner edge 49 in contact with the end 50 of the slide valve and a lug 51 formed on the bar fits into a corresponding notch formed in the end of the slide valve to prevent side movement of the bar 17 relative to the slide valve. The in and out reciprocation of the slide valve relative to the carrier 8, of course, effects a similar reciprocable movement of the bar 17, the bar 17 being preferably formed separately from the slide valve for assembly purposes. It could, however, be integral with the slide valve if the valve is assembled between the upper and lower halves of the carrier prior to anchoring the carrier to the canister walls. The shoulders 52 and 53 formed on the lower rail members constitute the inner limits of the slots 15 and 16 and in the outward travel of the slide valve the inner edge 49 of the bar 17 normally does not engage the shoulders 52 and 53 when the slide valve is retracted to its outermost position. As the forward edge 38 of the slide valve closes off the throat 36a of the hopper during the inward movement of said valve, the opening 37 accommodates the outer end 54 of the tongue 43 during the swinging movement of the dispensing spoon into dumping position as shown in Fig. 4.

In the operation of the device, for example, when the apparatus is being used to dispense ground coffee, the lid 4 is removed from the canister and the coffee is poured thereinto and the lid is then replaced. The coffee fills the hopper 36 and most of the remaining upper portin of the canister above the hopper. The slide valve D, due to the springs 47 and 48, is in the retracted position shown in Figs. 2 and 3 wherein the opening 37 is in full registry with the hopper throat 36a, this being the fully opened position of the valve. The spoon C is in closed position and the coffee is free to flow into the interior of the spoon filling same up to the undersurface of the valve. Then the rounded bead portion 56 on the valve is manually grasped and the valve is pushed inwardly until the edge 38 engages the inner face of the rear wall of the dispensing spoon causing the spoon to swing about the axis of the pin 32 and to dump its contents out the open end 57 of said spoon into the storage drawer E. The valve has completely closed off the throat 36a just prior to the engagement of the valve edge 38 with the rear wall of the spoon so that no additional coffee is permitted to be discharged into the spoon after the dumping of same has commenced. Thus an accurately measured quantity of coffee is discharged from the measuring spoon C into the drawer E. When the valve D is released the springs 47 and 48 move the valve back into the open position of Figs. 2 and 3 and the spoon C is simultaneously moved back into the closed position as shown in Fig. 2 by means of the spring 44.

The movement of the valve is very rapid and the spoon reaches fully closed position wherein the inner face 58 of the rear wall of the spoon engages the outer face 59 of the hopper throat before the valve commences to open. When the valve reaches fully open position wherein the edge 38 is in registry with the inner wall 39 of the throat, then the opposite edge 40 of the valve is in contact with the rear face of the rear wall of the dispensing spoon with the spoon in fully closed position. The engagement of the edge 40 of the valve with the rear wall of the dispensing spoon provides a stop which limits the outward travel of the valve. If it is desired, for example, to empty a sufficient quantity of coffee into the drawer E for making eight cups of liquid coffee, then it is only necessary to push the valve in eight times so that the measuring spoon is filled and emptied the same number of times. It will also be understood that the size of the spoon and hence its capacity can be of any pre-selected choice and is not to be considered limited to a "one cup of coffee" capacity.

I claim:

1. Apparatus for dispensing a measured quantity of fluent material comprising: a canister including a front wall having a horizontal valve slot and a drawer opening below said slot; a receiving drawer in said opening; means within said canister defining a pair of slideways disposed in a common horizontal plane with said valve slot; a hopper within said canister, having, at its lower extremity, a discharge nozzle terminating substantially at said plane; a measuring spoon including a receiving body of elongated channel form, open at its forward end and having a closed rear end portion including an integral arm projecting upwardly and pivotally mounted within the canister on a transverse horizontal axis immediately rearwardly of said hopper nozzle and above said slideway plane, for movement between an elevated receiving position wherein said receiving body is horizontal and disposed immediately below said slideway plane, and a discharge position wherein said receiving body is inclined downwardly at an angle such as to discharge the contents through its open end into said drawer; means yieldingly acting upon said spoon to normally maintain the same in said elevated receiving position; fixed means carried by the canister, closing said open forward end of the spoon in the raised receiving position thereof; and a valve slide of plate form disposed in said slideway plane with its side margins supported in said slideways for horizontal sliding movement between a forwardly projected, nozzle opening position wherein the material within the hopper may flow downwardly through the nozzle into said spoon and a nozzle closing rearwardly extended position wherein the rear extremity of said valve slide projects rearwardly of said nozzle and engages said spoon arm to swing said arm rearwardly and thereby cause said receiving body to be tilted to said downwardly inclined discharge position.

2. Apparatus as defined in claim 1, wherein said nozzle has a vertical rear side wall, engaged by the forward side of said spoon arm when the spoon is in the elevated receiving position, whereby to provide a stop for determining the elevated position of spoon.

3. Apparatus as defined in claim 1, wherein said yielding means comprises a coil spring, and including a tail lever projecting from the rear end of the spoon and an anchor bracket projecting forwardly from the rear area of the canister and having its forward end spaced below said tail lever, the respective ends of said spring being anchored to said tail lever and anchor bracket respectively, with the spring distended under tension.

4. Apparatus as defined in claim 1, wherein said spoon closing means comprises a flat transverse vertical wall formed as an integral part of said slideway means and projecting downwardly therefrom.

5. Apparatus as defined in claim 1, wherein said slide valve has a forward central portion thereof which is projected upwardly above said slideway plane and is engageable with the forward extremity of said nozzle to provide the stop determining the rear limit position of movement thereof.

References Cited in the file of this patent

UNITED STATES PATENTS

| | | |
|---|---|---|
| 703,279 | Kinnard | June 24, 1902 |
| 752,735 | Weise | Feb. 23, 1904 |
| 895,516 | Tucker | Aug. 11, 1908 |
| 950,286 | Hauty | Feb. 22, 1910 |
| 1,286,881 | Gray | Dec. 3, 1918 |
| 1,974,988 | Hillstrom | Sept. 25, 1934 |
| 2,119,055 | Peffer | May 31, 1938 |
| 2,161,190 | Paull | June 6, 1939 |
| 2,319,795 | Coffin | May 25, 1943 |
| 2,561,721 | Ardito | July 24, 1951 |